(12) United States Patent
Hoefler et al.

(10) Patent No.: US 9,457,638 B2
(45) Date of Patent: Oct. 4, 2016

(54) VEHICLE HAVING A TEXTILE CHANNEL

(75) Inventors: Werner Hoefler, Shanghai (CN); Dirk Rohwerder, Sprockhoevel (DE)

(73) Assignee: Siemens Aktiengesellschaft, Munich (DE)

(*) Notice: Subject to any disclaimer, the term of this patent is extended or adjusted under 35 U.S.C. 154(b) by 388 days.

(21) Appl. No.: 14/118,291

(22) PCT Filed: May 10, 2012

(86) PCT No.: PCT/EP2012/058631
§ 371 (c)(1),
(2), (4) Date: Nov. 18, 2013

(87) PCT Pub. No.: WO2012/156272
PCT Pub. Date: Nov. 22, 2012

(65) Prior Publication Data
US 2014/0087645 A1    Mar. 27, 2014

(30) Foreign Application Priority Data
May 17, 2011    (DE) .................. 10 2011 075 981

(51) Int. Cl.
| B61D 27/00 | (2006.01) |
| B60H 1/00 | (2006.01) |
| B61D 17/18 | (2006.01) |
| B60R 13/02 | (2006.01) |

(52) U.S. Cl.
CPC ....... B60H 1/00564 (2013.01); B60R 13/0212 (2013.01); B61D 17/18 (2013.01); B61D 27/0018 (2013.01); B61D 27/0072 (2013.01); B60R 2013/0287 (2013.01)

(58) Field of Classification Search
CPC .......... B60H 1/00564; B60R 13/0212; B60R 2013/0287; B61D 17/18; B61D 27/0018
USPC .......................................................... 454/83
See application file for complete search history.

(56) References Cited

U.S. PATENT DOCUMENTS

| 2,925,050 A | * | 2/1960 | Candlin, Jr. .......... B61D 17/08 105/397 |
| 6,899,381 B1 | * | 5/2005 | Fero .................... B60R 13/0225 296/208 |
| 7,959,220 B2 | | 6/2011 | Hoefler |
| 2009/0130967 A1 | * | 5/2009 | Hofler ................ B60H 1/00564 454/83 |
| 2011/0024561 A1 | | 2/2011 | Kofinger et al. |
| 2012/0102846 A1 | | 5/2012 | Assel |

FOREIGN PATENT DOCUMENTS

| DE | 4430075 A1 | 2/1996 |
| DE | 10140985 A1 | 3/2003 |

(Continued)

OTHER PUBLICATIONS

Translation of abstract of JP 04232043A dovument.*

*Primary Examiner* — Helena Kosanovic
(74) *Attorney, Agent, or Firm* — Laurence Greenberg; Werner Stemer; Ralph Locher

(57) ABSTRACT

A vehicle includes a body, an inner cover disposed in the body and a textile channel conducting conditioned air, extending between the body and the inner cover and being made of a textile fabric. In order to provide such a vehicle having a textile channel that is easy to install, the textile channel is provided on the body and held against the inner cover by a hook and loop fastener.

8 Claims, 2 Drawing Sheets

(56) References Cited

FOREIGN PATENT DOCUMENTS

| | | |
|---|---|---|
| DE | 0 2005 031 912 A1 | 1/2007 |
| DE | 10 2005 040 571 A1 | 3/2007 |
| EP | 2 043 890 B1 | 6/2010 |
| JP | 04232043 A * | 8/1992 |
| RU | 2380253 C2 | 1/2010 |
| RU | 2009107852 A | 9/2010 |
| WO | 2007006616 A1 | 1/2007 |
| WO | 2008022752 A1 | 2/2008 |
| WO | 2011003733 A1 | 1/2011 |

* cited by examiner

VEHICLE HAVING A TEXTILE CHANNEL

BACKGROUND OF THE INVENTION

Field of the Invention

The invention relates to a vehicle comprising a body, an inner cover arranged in the body and a textile channel for conducting conditioning air that extends between the body and the inner cover and is made of a textile fabric.

Railway vehicles are known in the field, which are equipped with air conditioning devices for conditioning passenger compartments in the railway vehicle. An air flow is generated here, which is conveyed by way of ventilation channels through the passenger compartments. It is known here to manufacture the ventilation channels from a textile fabric. Difficulties nevertheless often arise during installation, in other words when attaching the textile channel to the body of the railway vehicle on the one hand and to the inner cover on the other hand.

BRIEF SUMMARY OF THE INVENTION

The object of the invention is therefore to provide a vehicle of the type cited in the introduction having a textile channel which can be easily installed and dismantled.

The invention achieves this object in that the textile channel is attached to the body and only held on the inner cover by means of a Velcro fastener.

In accordance with the invention, the textile channel is firmly connected to the body in any manner. For instance, the textile channel is suspended on the roof area of the body. The textile channel can therefore first be securely fastened to the body. The inner cover is then installed in the body, wherein the textile channel can merely be connected to the inner cover by way of a Velcro fastener. A Velcro fastener can be obtained at low cost and allows for a simple and variable connection between the textile channel and inner cover. Furthermore, the Velcro fastener can be rapidly opened and closed again. Means for fastening the textile channel to the body are integrated in the body. This is advantageously already done during the manufacture of the body. Within the scope of the invention, a rapid, easy and cost-effective installation and/or dismantling is thus enabled. This also reduces the costs of the inventive vehicle.

Textile fabrics involve any materials which consist of textile raw materials, such as fibers or threads. The term "thread" should be understood here to mean both yarns and also twines, in other words threads made up of a number of twines. Textile fabrics which consist of threads are also referred to as unwoven fabric. They include all fiber cloths, knitwear, knitted fabrics, meshes, nets and laces and suchlike. Textile fabrics nevertheless also include what are known as unwoven fabrics, which are also known as nonwoven fabrics. Combined fabrics, in other words textile fabrics made up of different layers, which can be connected in parallel to one another, can finally also be used within the scope of the invention. The textile channel is expediently sewn together from a number of webs of the textile fabric.

The textile channel is advantageously attached to the body by means of guide rails, wherein the guide rails are firmly connected to the body. According to this development, guide rails are embedded in the carcass or connected thereto in any manner during manufacture of the body. The guide rails extend here for instance into an expedient inner insulation of the body. The textile channel can then easily be installed by hand without the need for an assembly tool.

According to an expedient embodiment in this respect, the guide rails have a retaining groove, in which an insertion head which is permanently connected to the textile channel is held in a form-fit manner, wherein the guide rail provides a guide which can be moved in its longitudinal direction. According to this advantageous embodiment, the textile channel is connected to the body in the manner of curtains, by way of a rail guidance. The rail guidance allows for a longitudinally moveable displacement of the fastener of the textile channel and thus increases the degree of freedom during assembly. Furthermore, such a guide rail is available cost-effectively on the market and can be easily attached to the body, for instance by welding or other embedding or connecting methods. The insertion head can be embodied for instance as a cloth thickener. It is however also possible to manufacture the insertion head from another material, for instance from a plastic, which is connected to the rest of the textile channel by means of expedient connection means. During installation, the insertion head is fed into the guide rails. The textile channel can then be easily fastened to the inner cover by means of a Velcro fastener. When the textile channel is cleaned or replaced, the Velcro tape is released and the entire textile channel is pulled out of the inner cover and the guide rails.

The inner cover advantageously includes at least one roof panel fastened to the body, which is equipped with two vertical fastening bars, wherein the fastening bars are provided with a Velcro tape and embody the Velcro fastener with a complimentary latching part of the textile channel. The textile channel naturally extends according to this advantageous development of the invention between the roof panel and the body. The roof panel can be manufactured in a modular and prefabricated manner, wherein it already comprises expedient Velcro fastener connecting parts.

According to an expedient development in this respect, the Velcro fastener extends across the entire length of each roof panel, wherein air outlet openings which communicate with air blower openings in the roof panel are provided in the section of the textile channel which extends between the latching parts and which faces the roof panels. In other words, the conditioning air is transported by the textile channel in an intermediate space, which is delimited by the roof of the body and the roof panels. From there they finally arrive in the passenger compartment via the blower openings of the roof panel. An advantage of the continuous Velcro fastener, which extends along each roof panel and thus almost along the entire longitudinal extension of the cover channel on both sides of the intermediate space, consists in its sealing effect, which develops in respect of the said intermediate space. This sealing effect ensures that the air does not escape laterally out of the intermediate space and remains between the body and the inner cover, but is instead explicitly blown out into the passenger compartment.

The roof panel advantageously forms an electrically insulated overlay between the fastening bars for the textile panel. On account of this overlay, the textile channel can lie against the roof panel. This facilitates installation even further.

According to an expedient development in this respect, the overlay is equipped with a soft surface. The soft surface prevents damage to the textile channel during continuous friction, which could result during long-term operation of the vehicle.

The textile channel is expediently equipped with an inner membrane, by means of which the textile channel is divided into a hot air area for guiding heated air and a cold air area for guiding cooled air. In this way, any given temperatures can be created inside the vehicle.

The textile channel expediently consists of a non-combustible material. Non-combustible textile fabrics are known to the person skilled in the art. The industrial material "Trevira" for producing the textile channel is only mentioned by way of example here.

BRIEF DESCRIPTION OF THE SEVERAL VIEWS OF THE DRAWING

Further expedient embodiments and advantages of the invention form the subject matter of the subsequent description of exemplary embodiments of the invention with respect to the figures in the drawing, wherein the same figures refer to reference characters with a similar function, and wherein.

DESCRIPTION OF THE INVENTION

Figure 1:
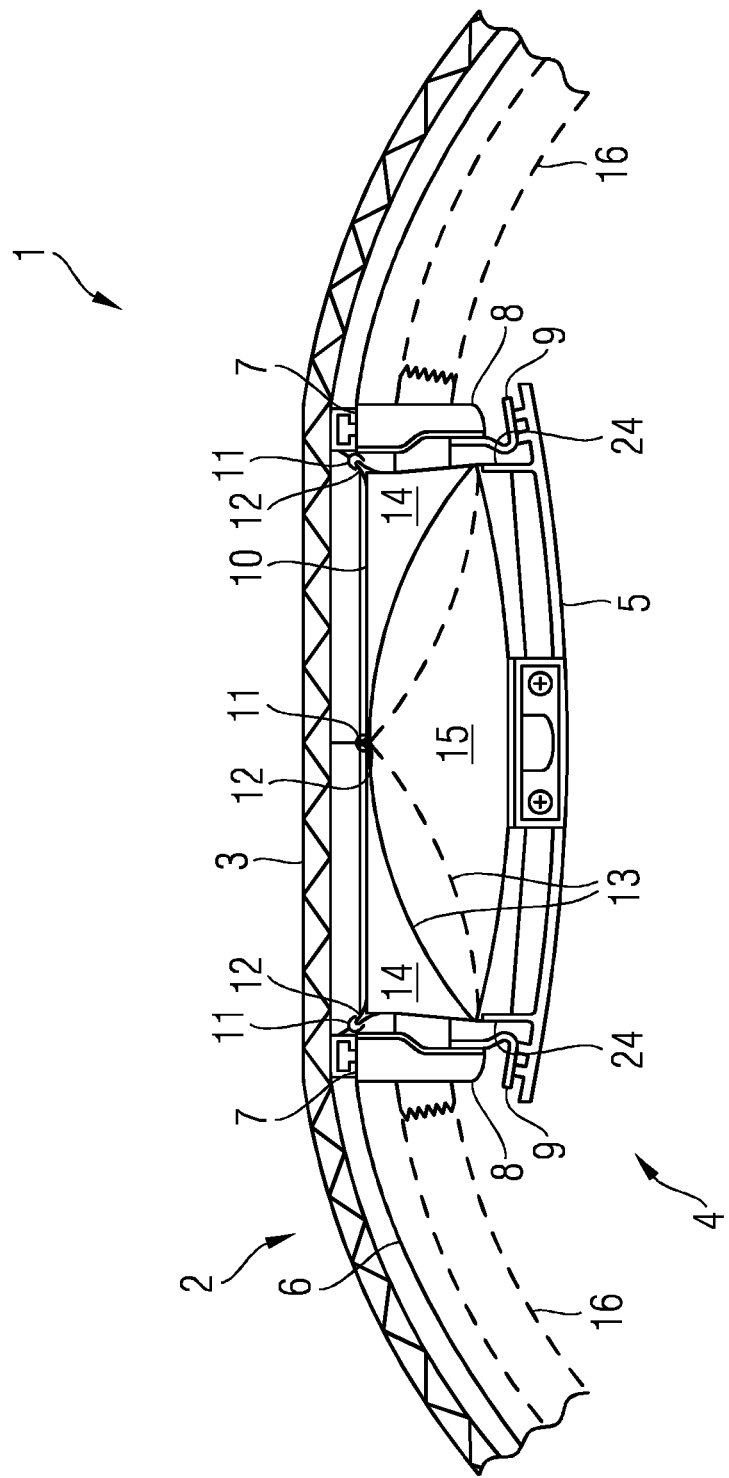
FIG. 1 shows an exemplary embodiment of the inventive vehicle in a sectional side view and FIG. 2 shows a roof panel of the vehicle according to FIG. 1 in a perspective view.

FIG. 1 shows an exemplary embodiment of the inventive vehicle 1 in a sectional side view. It is apparent that the vehicle 1 has a body 2, which, in addition to the body roof 2 shown, has side walls (not shown in the Figures) and a body base which is opposite the body roof. The inside of the body 2 forms a passenger compartment in the exemplary embodiment shown in FIG. 1, which is used to transport passengers. For aesthetic reasons, cabling, ventilation channels and suchlike are shielded from view by an inner cover 4, only a roof panel 5 of which is visible in FIG. 1.

Two C-rails 7 are firmly cast in an insulation layer 6 extending on the inner wall of the body 2 in order to fasten the roof panel 5 to the body roof 3. With the aid of a T-fixture connection, retaining arms 8 are fastened to C-rails and thus to the body 2, wherein the roof panel 5 is permanently screwed to the retaining arms 8 with the aid of fastening lugs 9. A textile channel 10 extends between the roof panel 5 and body roof 3. The textile channel 10 consists of a textile fabric, which is flame-resistant. In order to be able to rapidly and cost-effectively install the textile channel 10 and if necessary to dismantle the same, said channel is suspended on the vehicle body roof 3 and held on the roof panel 5 solely by means of Velcro fastener 24.

In order to fasten or suspend the textile channel 10 on the vehicle body roof 3, guide rails 11 connected to the vehicle body roof 3 are cast in the insulation layer 6. The guide rails 11 have a receive groove, in which insertion heads 12 of the textile channel 10 are held in a form-fit manner. According to a curtain support, the insertion heads 12 are connected to the remaining material of the textile channel 10 by way of webs, wherein the guide rails 11 allow for guidance of the insertion heads 12 in the longitudinal direction of the body 2. The insertion heads 12 of the textile channel 10 are moved at the front face into the guide rails 11 which are already permanently integrated into the body 2, so that the entire textile channel 10 can subsequently be easily suspended on the vehicle body roof 3. The longitudinally moveable guidance of the insertion heads 12 facilitates installation and dismantling of the textile channel 10.

The textile channel 10 has an inner membrane 13, which separates a warm air area 14 from a cold air area 15. The membrane is shown in two positions. In the position of the membrane 13 shown with solid lines, the cold air area 14 is exposed to pressure. The passenger compartment is cooled. In order to heat the passenger compartment, heated air is blown into the warm air area 14, so that the inner membrane 13 moves into the position shown by a dashed line, and this heated air is routed into the floor channels by way of warm air tubes 16.

The deflection of the warm/cold air into the textile channel is controlled by an air distribution box on the air conditioning device.

Figure 2:
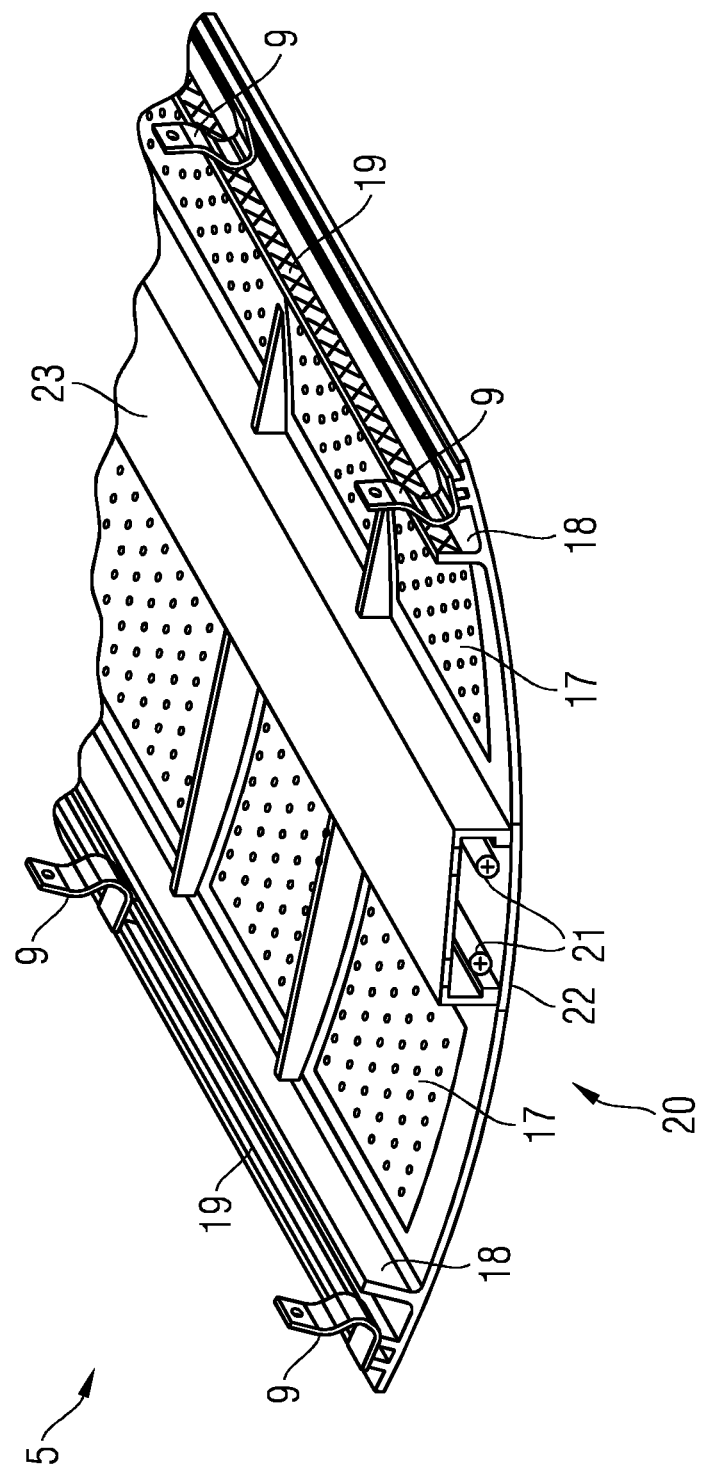

FIG. 2 shows a perspective view of the roof panel 5. In this diagram the fastening lugs 9 for fastening the roof panel 5 to the holding arms 8 can be seen. The roof panel 5 has blower sections 17 with blower openings, by way of which air transported through the textile channel 10 is blown out into the passenger compartment. The blower sections 17 extend between two fastening bars 18, which each comprise a Velcro tape 19 on their sides which face away from one another. The fastening bars 18 and the Velcro tape 19 extend in the longitudinal direction of the roof panel 5 across the entire length of the roof panel 5.

A light 20 can be seen in the center of the roof panel 5, which is used to illuminate the passenger compartment. To this end, the lighting facility 20 comprises expedient fluorescent tubes 21, which likewise extend in the longitudinal direction of the roof panel 5. The fluorescent tubes are covered by a transparent plastic disk 22 toward the inside of the body 2. Above the plastic disk 22, the lighting facility 20 forms an electrically insulated overlay 23, which is coated with an insulating and soft material. The textile channel 10 is rests freely on this overlay, in other words without a fastener.

With respect to FIG. 1, it is apparent that the textile channel 10 has two material webs extended in the longitudinal direction on its two sides, which embody the Velcro fastener 24 with the Velcro tape 19 of the fastening bars 18. In other words, each of the material webs is equipped with a latching part or a hook part of the Velcro fastener which embodies the Velcro fastener 24 with the Velcro tape 19. Air outlet openings are introduced into the textile channel 10 between the latching parts of the material webs. Air can escape into an intermediate space through the air outlet openings, said intermediate space being restricted by the textile channel 10 and the roof panel 5. From here the conditioning air reaches the passenger compartment inside the body 2 by way of the air blower openings of the roof panel 5. Here the Velcro fastener 19, 24 develops a sealing effect, so that the conditioning air reaches the passenger interior from the intermediate space restricted by textile channel 10 and roof panel 5 by way of the blow-out openings of the roof panel 5 and does not laterally exit the intermediate space in order essentially to remain between body 2 and inner cover 4.

The invention claimed is:

1. A vehicle, comprising:
a body;
an inner cover disposed in said body;
a textile channel configured to conduct conditioned air, said textile channel extending between said body and said inner cover and being made of a textile fabric;
a hook and loop fastener attaching said textile channel to said inner cover;
wherein said inner cover includes at least one roof panel fastened to said body, said at least one roof panel is equipped with two vertical fastening bars, said vertical fastening bars are equipped with a hook and loop tape forming said hook and loop fastener together with a complementary latching part of said textile channel, and said hook and loop fastener extends over an entire length of said at least one roof panel.

2. The vehicle according to claim 1, which further comprises guide rails firmly connected to said body, said textile channel being attached to said body by said guide rails.

3. The vehicle according to claim 2, further comprising an insertion head connected firmly to said textile channel being held in a form-locking manner in said guide rails causing said guide rails to provide a guide being movable in longitudinal direction of said guide rails.

4. The vehicle according to claim 1, wherein said textile channel has a region extending between said vertical fastening bars, and said region of said textile channel has air outlet openings communicating with air blower openings in said at least one roof panel.

5. The vehicle according to claim 4, wherein said at least one roof panel includes an overlay, disposed between said fastening bars, for said textile channel.

6. The vehicle according to claim 5, wherein said overlay is electrically insulated.

7. The vehicle according to claim 1, wherein said textile channel is equipped with an inner membrane dividing said textile channel into a hot air area for guiding heated air and a cold air area for guiding cooled air.

8. The vehicle according to claim 1, wherein said textile channel is formed of a flame-resistant textile fabric.

\* \* \* \* \*